US012776548B2

(12) United States Patent
Qiu et al.

(10) Patent No.: US 12,776,548 B2
(45) Date of Patent: Oct. 27, 2026

(54) BATTERY CELL MODULE AND BATTERY SYSTEM

(71) Applicant: EVE POWER CO., LTD., Jingmen (CN)

(72) Inventors: Wencong Qiu, Jingmen (CN); Zhaohai Chen, Jingmen (CN); Zhiwei Chen, Jingmen (CN); Jibing Jiang, Jingmen (CN); Fan Li, Jingmen (CN)

(73) Assignee: EVE POWER CO., LTD., Jingmen (CN)

( * ) Notice: Subject to any disclaimer, the term of this patent is extended or adjusted under 35 U.S.C. 154(b) by 806 days.

(21) Appl. No.: 18/002,729

(22) PCT Filed: Oct. 12, 2022

(86) PCT No.: PCT/CN2022/124894
§ 371 (c)(1),
(2) Date: Dec. 21, 2022

(87) PCT Pub. No.: WO2023/142529
PCT Pub. Date: Aug. 3, 2023

(65) Prior Publication Data

US 2024/0243416 A1 Jul. 18, 2024

(30) Foreign Application Priority Data

Jan. 29, 2022 (CN) ......................... 202220244833.2

(51) Int. Cl.
*H01M 50/291* (2021.01)
*H01M 50/213* (2021.01)
*H01M 50/30* (2021.01)

(52) U.S. Cl.
CPC ....... *H01M 50/291* (2021.01); *H01M 50/213* (2021.01); *H01M 50/394* (2021.01)

(58) Field of Classification Search
None
See application file for complete search history.

(56) References Cited

U.S. PATENT DOCUMENTS 8,999,540 B2 * 4/2015 Bang .................. H01M 50/213 429/96
12,100,854 B2 * 9/2024 Waldschütz ........ H01M 50/213
2009/0233163 A1 * 9/2009 Fang .................. H01M 50/222 429/99

FOREIGN PATENT DOCUMENTS

CN 206332064 U 7/2017
CN 109037514 A 12/2018
(Continued)

OTHER PUBLICATIONS

Machine translation of CN 212571202 U (Year: 2025).*
(Continued)

*Primary Examiner* — Maria Laios
(74) *Attorney, Agent, or Firm* — PV IP PC; Wei Te Chung

(57) ABSTRACT

The present application discloses a battery cell module and a battery system. The battery cell module includes a plurality of battery cell units, each of the battery cell units includes a battery cell and a base, and bases of adjacent ones of the battery cell units are detachably connected to each other; the base includes an installation slot and a pressure relief cavity communicated with each other, where an end of the battery cell is disposed in the installation slot, and the pressure relief cavity is provided with a plurality of pressure relief holes.

17 Claims, 3 Drawing Sheets

(56) References Cited

FOREIGN PATENT DOCUMENTS

| | | | |
|---|---|---|---|
| CN | 110148692 | A | 8/2019 |
| CN | 212571202 | U | 2/2021 |
| CN | 214797573 | U | 11/2021 |
| CN | 215008485 | U | 12/2021 |
| CN | 114464941 | A | 5/2022 |
| CN | 217158418 | U | 8/2022 |
| CN | 217158421 | U | 8/2022 |
| EP | 4243173 | A1 | 9/2023 |

OTHER PUBLICATIONS

International Search Report in International application No. PCT/CN2022/124894, mailed on Oct. 12, 2022.

Written Opinion of the International Search Authority in International application No. PCT/CN2022/124894, mailed on Jan. 12, 2022.

* cited by examiner

BATTERY CELL MODULE AND BATTERY SYSTEM

CROSS-REFERENCE TO RELATED APPLICATION

This application is a national stage of International Application No. PCT/CN2022/124894, filed on Oct. 12, 2022, which claims priority to Chinese Patent Application No. 202220244833.2, filed on Jan. 29, 2022. The aforementioned application is herein incorporated by reference in its entirety.

TECHNICAL FIELD

The present application relates to the technical field of battery technologies, for example, to a battery cell module and a battery system.

BACKGROUND

New energy vehicles have realized leap-style development, such as new energy vehicles adopting lithium batteries as motive power. Cylindrical battery cells of the lithium batteries are widely used in power systems. However, small capacity of a single battery cell leads to a large number of batteries in a single string.

In generally cylindrical battery cell modules, the battery cells are positioned by tooling and then bonded together by glues, which leads to inaccurate position of the battery cells and affects position accuracy of adjacent battery cells, thus resulting in a great cumulative tolerance.

In addition, in the related art, negative terminals of the battery cells of the battery cell modules are shielded. If a thermal runaway occurs in the battery cells, gas ejected from the battery cells cannot be discharged quickly, resulting in existence of potential safety hazards.

SUMMARY

The present application provides a battery cell module and a battery system, which can solve problems of inaccurate position of battery cells and failure to rapidly discharge gas generated by the battery cells under circumstance of a thermal runaway.

In a first aspect, a battery cell module is provided in embodiments of the present application, including a plurality of battery cell units, wherein each of the battery cell units includes a battery cell and a base, and bases of adjacent ones of the battery cell units are detachably connected to each other; each of the bases includes an installation slot and a pressure relief cavity communicated with each other, where an end of the battery cell is disposed in the installation slot, and the pressure relief cavity is provided with pressure relief holes.

In an embodiment, each of the bases includes: a base body, wherein the base body is provided with the pressure relief cavity, and a top surface of the base body is provided with a via hole communicated with the pressure relief cavity; and a plurality of side plates connected to the base body and disposed surrounding a circumferential edge of the base body, wherein the installation slot is defined by the plurality of side plates and the top surface of the base body, and the installation slot is communicated with the via hole.

In an embodiment, the plurality of pressure relief holes are respectively disposed on side walls of the base body.

In an embodiment, the base body includes: a top plate, configured to support an end of the battery cell located in the installation slot; a bottom plate, disposed opposite to and at intervals with the top plate to form the pressure relief cavity between the top plate and the bottom plate, wherein the via hole penetrates through the top plate and the bottom plate; and a plurality of reinforcing blocks disposed between the top plate and the bottom plate and arranged at intervals along a circumferential direction of the via hole, wherein one of the pressure relief holes is formed between every two adjacent ones of the reinforcing blocks.

In an embodiment, two opposite side plates of adjacent two of the battery cell units are engaged with each other.

In an embodiment, the base body is a regular prism structure, each side surface of the base body is provided with one of the side plates, a number of the side plates disposed on the base body is an even number, a first one of the two opposite ones of the side plates is provided with a clamping block, and a second one of the two opposite ones of the side plates is provided with a clamping slot.

In an embodiment, a width of the clamping slot gradually increases towards inside of the installation slot along a radial direction of the battery cell, and a shape of the clamping block is matched with a shape of the clamping slot.

In an embodiment, the base body is a regular hexagonal prism structure.

In an embodiment, the battery cell is cylindrical, a side surface of each of the plurality of side plates facing the battery cell corresponding to the side plates is an arc-shaped surface matched with an outer wall of the battery cell, and a side surface of each of the plurality of side plates away from the battery cell is a plane.

In an embodiment, a middle portion of each of the plurality of side plates is provided with a notch with an opening upward facing another end of the battery cell.

In an embodiment, the base is an integrated molding structure.

In an embodiment, a height of the pressure relief cavity ranges from 5 mm to 20 mm.

In an embodiment, a depth of the installation slot ranges from 5 mm to 20 mm.

In an embodiment, the battery cell is fixedly bonded into the installation slot.

In an embodiment, the installation slot is provided with a plurality of gluing slots.

In an embodiment, the plurality of gluing slots are disposed on a bottom surface of the installation slot and close to an inner wall of the installation slot.

In an embodiment, the plurality of gluing slots are extended into the plurality of reinforcing blocks one by one.

In an embodiment, a width of each of the gluing slots is gradually increased towards outside of the installation slot along a radial direction of the battery cell.

In a second aspect, a battery system is provided in embodiments of the present application, including any of the above-mentioned battery cell modules.

Beneficial effects according to the embodiments:

According to the battery cell module in the present application, each of the battery cells is individually provided with the base, and the bases are spliced to form a group, which is beneficial to improve a relative location accuracy between the battery cells, thereby improving assembly accuracy of the battery cell module. An assembly quantity of the battery cells may be adjusted adaptively according to capacity, and a size and a shape of a box body of the battery cell module, which makes grouping methods more flexible. After the battery cells are grouped, since the bases are connected as a whole, it is beneficial to improve structural strength and reliability of the battery cell module.

Since an end of the battery cell is extended into the installation slot, an extension direction of the battery cell may be limited by a side wall of the installation slot, which is beneficial to improved position accuracy of the battery cell and ensuring that a plurality of battery cells are parallel after they are grouped. The pressure relief cavity is communicated with the installation slot, which can make gas generated by the battery cell enter the pressure relief cavity under circumstance of the thermal runaway and be discharged through the pressure relief holes to avoid burning or explosion of the battery cell.

By adopting the above battery cell module, the battery system provided by the present application has high processing precision, low cost, and a reliable structure.

REFERENCE NUMERALS

1, battery cell; 2, base; 21, base body; 211, top plate; 2111, via hole; 2112. gluing slot; 212, bottom plate; 213, reinforcing block; 22, side plate; 221, clamping block; 222, clamping slot; 223, notch; 23, pressure relief hole; 24, installation slot; 25, pressure relief cavity.

DETAILED DESCRIPTION OF THE EMBODIMENT

In description of the present application, unless otherwise specified and defined, terms "connected with", "connected" and "fixed" should be understood in a broad sense, for example, it may be a fixed connection, a detachable connection, or a whole; it may be a mechanical connection or an electrical connection; it may be a directly connection or an indirectly connection through an intermediate media; and it may be an internal connection of two components or an interaction relationship between two components. For those skilled in the art, meanings of the above terms in the present application can be understood according to situations.

In the present application, unless otherwise specified and defined, a first feature is disposed "on" or "under" a second feature may include a direct contact between the first feature and the second feature, or a contact between the first feature and the second feature through other features rather than the direct contact. Moreover, that the first feature is disposed "up", "above" or "up" the second feature includes that the first feature is right above or obliquely above the second feature, or only indicate that a horizontal height of the first feature is greater than a horizontal height of the second feature. That the first feature is disposed "under", "below", or "underneath" of the second feature include that the first feature is right below or obliquely below the second feature, or only indicate that the horizontal height of the first feature is less than the horizontal height of the second feature.

In the description of this embodiment, terms indicating orientation or location relationships such as "up", "down", "left", and "right" are based on orientation or location relationships shown in drawings, which are only for a convenience of description and simplified operation, rather than indicating or implying that devices or elements referred to must have a specific orientation, be constructed and operated in a specific orientation, so it cannot be understood as a limitation of the present application. In addition, terms "first" and "second" are only used to distinguish in terms of description and have no special meanings.

Figure 1:
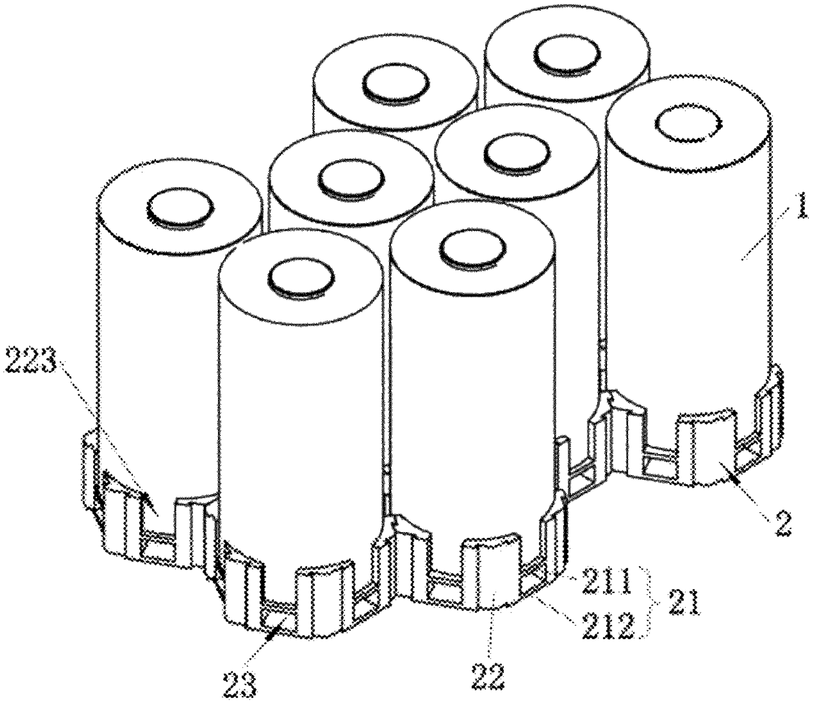
FIG. 1 is a schematic structural diagram of a battery cell module provided by the present application.
Figure 2:
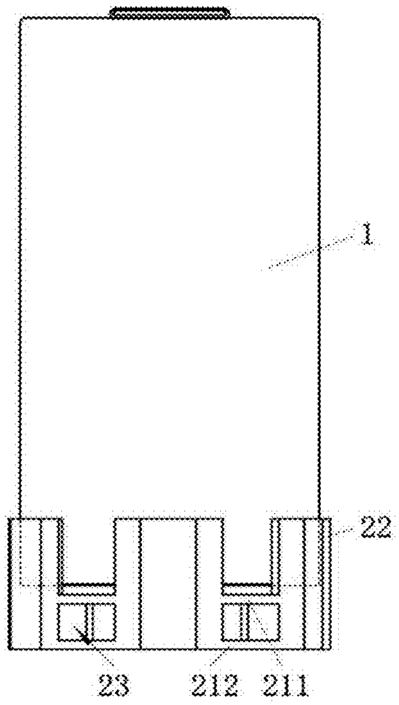
FIG. 2 is a front view of a battery cell unit provided by the present application.

As shown in FIG. 1 and FIG. 2, the embodiment provides a battery system, which includes a battery cell module. The battery cell module includes a plurality of battery cell units, where each of the battery cell units includes a battery cell 1 and a base 2. Each of the battery cells 1 is individually provided with the base 2, where the bases 2 of adjacent battery cell units are detachably connected to each other, so that a plurality of battery cells 1 are relatively fixed into a group. When the battery cell module is assembled, the battery cell 1 is first connected to the base 2 corresponding to the battery cell 1 to form the battery cell unit, and then the bases 2 are spliced to enable the plurality of battery cells 1 to be relatively fixed into the group.

In the embodiment, the battery cell module does not need to be positioned by tooling during an assembly process, and each battery cell 1 is individually provided with the base 2, which makes grouping of the battery cells 1 more convenient. The bases 2 are spliced, which is beneficial to improve relative location accuracy between the battery cells 1, thereby improving assembly accuracy of the battery cell module. An assembly quantity of the battery cells 1 may be adjusted adaptively according to capacity, and a size and a shape of a box body of the battery cell module, which makes grouping methods more flexible. After the battery cells 1 are grouped, the bases 2 are connected as a whole, which is beneficial to improve structural strength and reliability of the battery cell module.

Heat is generally generated during an operation of the battery cell 1. If a temperature of the battery cell 1 is too high to occur a thermal runaway, a high pressure gas will be generated in the battery cell 1. If the gas cannot be discharged quickly, a risk of explosion will exist in the battery cell 1 with an increase of atmospheric pressure. In order to ensure safe use of the battery cell module, the base 2 includes an installation slot 24 and a pressure relief cavity 25 communicated with each other, where an end of the battery cell 1 is disposed in the installation slot 24, the pressure relief cavity 25 is provided with a plurality of pressure relief holes 23, and a bottom portion of the battery cell 1 abuts against a bottom portion of the installation slot 24. When a thermal runaway occurs in the battery cell 1, an explosion-proof valve located at the bottom portion of the battery cell 1 bursts, so that gas and ejecta generated inside the battery cell 1 can enter the pressure relief cavity 25 from the installation slot 24 and be discharged through the plurality of pressure relief holes, so as to achieve a goal of no fire and no explosion of the battery cell 1 under circumstance of the thermal runaway, thus ensuring safe use of the battery cell module and greatly reducing impacts on other battery cells 1.

In the embodiment, a negative terminal of the battery cell 1 is provided with the explosion-proof valve, so the negative terminal of the battery cell 1 is disposed in the installation slot 24. In other embodiments, if the battery cell releases pressure from a positive terminal of the battery cell, the positive terminal is disposed in the installation slot 24.

In order to ensure a pressure relief effect of the pressure relief cavity 25 and enable the explosion-proof valve located at the bottom portion of the battery cell 1 to be opened effectively, the pressure relief cavity 25 needs to have a space. Optionally, a height of the pressure relief cavity 25 ranges from 5 mm to 20 mm, such as 10 mm, 12 mm, 15 mm, or 18 mm. The pressure relief effect of the pressure relief cavity 25 is great when the height of the pressure relief cavity 25 is within the above range.

Figure 3:
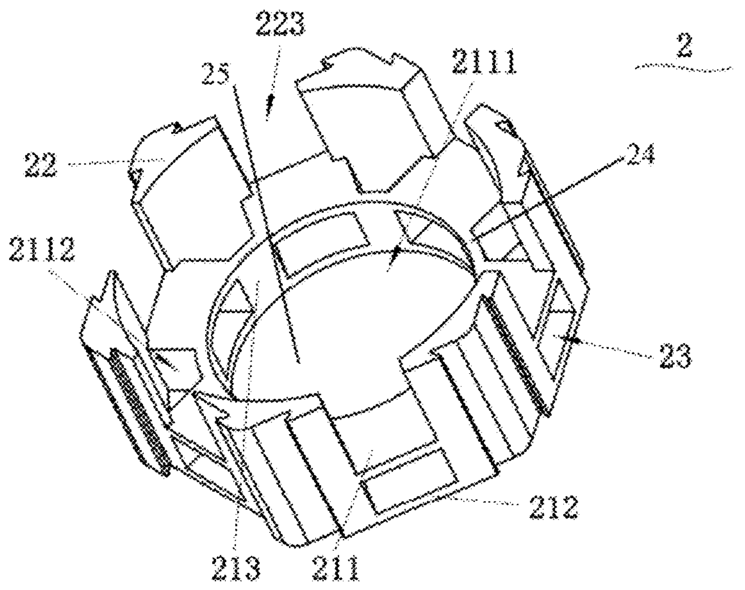
FIG. 3 is a schematic structural diagram of a base provided by the present application.

As shown in FIG. 1 and FIG. 3, the base 2 includes a base body 21 and a plurality of side plates 22. The base body 21 is configured with the pressure relief cavity 25, and a top surface of the base body 21 is provided with a via hole 2111 communicated with the pressure relief cavity 25. The plurality of side plates 22 are connected to the base body 21, and disposed surrounding a circumferential edge of the base body 21. The installation slot 24 is defined by the top surface of the base body 21 and the plurality of side plates 22. The installation slot 24 is communicated with the pressure relief cavity 25 by the via hole 2111. When an end of the battery cell 1 is inserted in the installation slot 24, the explosion-proof valve located at the bottom portion of the battery cell 1 is opposite to the via hole 2111. When a thermal runaway occurs in the battery cell 1, the via hole 2111 provides a blasting space for the explosion-proof valve, and the gas and the ejecta generated by the battery cell 1 enter the pressure relief cavity 25 through the via hole 2111, and then are discharged through the plurality of pressure relief holes 23.

Optionally, the plurality of pressure relief holes 23 are disposed on a side surface of the base body 21 to discharge gas along a radial direction of the battery cell 1, so as to prevent the gas from flowing upward to contact the battery cell 1, which is beneficial to improve a safety performance of the battery cell module.

The base 2 is sleeved on an axial end of the battery cell 1 through the installation slot 24. An extension direction of the battery cell 1 may be limited by a side wall of the installation slot 24, so that it can be ensured that the plurality of battery cells 1 are arranged in parallel after the plurality of battery cells 1 are grouped, thereby further improving the position accuracy of the battery cell 1.

In order to improve a position effect of the installation slot 24 on the battery cell 1, a certain matching depth between the installation slot 24 and the battery cell 1 needs to be defined. Optionally, a depth of the installation slot 24 ranges from 5 mm to 20 mm, such as 10 mm, 12 mm, 15 mm, or 18 mm.

An end of the battery cell 1 is fixedly bonded into the installation slot 24, so as to prevent from damaging a structure of the battery cell 1 and reduce a size of the base 2 and the battery cell 1 after they are fixed, on a basis of achieving a fixation of the base 2 and the battery cell 1.

In order to improve a fixing effect of the battery cell 1 and the base 2, the installation slot 24 is provided with a plurality of gluing slots 2112, where the plurality of gluing slots 2112 are configured to accommodate glues, so as to ensure that sufficient glues may be configured to bond the battery cell 1 and the base 1, thereby improving a firmness degree of bonding.

Optionally, the plurality of gluing slots 2112 are disposed on a bottom surface of the installation slot 24 to facilitate application of the glues. Compared with applying the glues on the side wall of the installation slot 24, the above arrangement may prevent the glues from flowing around under an action of gravity, so as to prevent the glues from adhering to other locations of the base 2 and the battery cell 1.

The plurality of gluing slots 2112 are disposed close to the side wall of the installation slot 24, that is, the plurality of gluing slots 2112 are disposed at an edge of the base 21 to prevent the glues from blocking the via hole and affecting pressure relief.

In the embodiment, the plurality of gluing slots 2112 are arranged at intervals along a circumferential direction of the base body 21. By disposing the plurality of gluing slots 2112, a plurality of bonding locations are defined between the battery cell 1 and the base 1, and the plurality of bonding locations are close to an edge of the battery cell 1 along a radial direction of the battery cell 1, which is beneficial to improve a firmness degree of fixation.

As shown in FIG. 3, the base body 21 includes a top plate 211, a bottom plate 212, and a plurality of reinforcing blocks 213. The top plate 211 is disposed opposite to and at intervals with the bottom plate 212 to define the pressure relief cavity 25. The via hole 2111 penetrates through the top plate 211 and the bottom plate 212. The plurality of reinforcing blocks 213 are disposed between the top plate 211 and the bottom plate 212, and are connected to the top plate 211 and the bottom plate 212, respectively, so that the base body 21 is form into a whole. When the battery cell 1 is fixed with the base 2, the top plate 211 is configured to support an end surface of an end of the battery cell 1 located in the installation slot 24, and the plurality of gluing slots 2112 are disposed on the top plate 211, so that the battery cell 1 is fixedly bonded with the top plate 211. In the embodiment, the pressure relief cavity 25 includes a cylindrical cavity below the via hole 2111 and a cavity between every two adjacent reinforcing blocks.

The plurality of reinforcing blocks 213 are located below the plurality of gluing slots 2112 to ensure that each of the plurality of gluing slots 2112 is defined with a certain depth to accommodate more glues, and the plurality of gluing slots 2112 are extended downward into the plurality of reinforcing blocks 213 one by one to ensure that each of the plurality of gluing slots 2112 has a sufficient depth.

In addition, the plurality of reinforcing blocks 213 is disposed below the plurality of gluing slots 2112, which is further beneficial to improve strength of the base body 21, so as to ensure that the base body 21 has sufficient capacity to support the battery cell 1.

In the embodiment, the plurality of reinforcing blocks 213 are disposed at intervals along the circumferential direction of the via hole 2111, and one of the pressure relief holes 23 is formed between every two adjacent reinforcing blocks 213, so that the pressure relief cavity is communicated with external.

In order to improve the fixing effect of the base 2 and the battery cell 1, a bonding area between the base 21 and the battery cell 1 ranges from 50% to 80% of a contact area between the base 21 and the battery cell 1, such as 60%, 65%, 70%, or 75%.

In order to facilitate an extension of an end of the battery cell 1 inside the installation slot 24, the installation slot 24 is disposed in clearance fit with the battery cell 1 to facilitate assembly of the battery cell 1 and the base 2.

In order to ensure certain contact pressure between the side plates 22 and the battery cell 1 to improve a bonding effect, optionally, a fit clearance between the installation slot 24 and the battery cell 1 ranges from 1 mm to 2 mm, such as 1.2 mm, 1.4 mm, 1.5 mm, 1.7 mm, or 1.9 mm.

The base 2 is designed as prismatic as a whole to make a structure of the plurality of bases 2 after they are spliced more compact and smaller. The base 21 is designed as a regular prism structure. Each side surface of the base 21 is provided with the side plate 22. Two opposite side plates 22 in the two adjacent bases 2 are detachably connected with each other to enable the two adjacent bases 2 be connected to each other. It can be understood that, on a basis that a size of the base 2 along a radial direction of the battery cell 1 remains unchanged, an area of polygon is less than an area of circle, which can save space and materials required for processing the base 2, and be beneficial to reduce cost.

Figure 4:
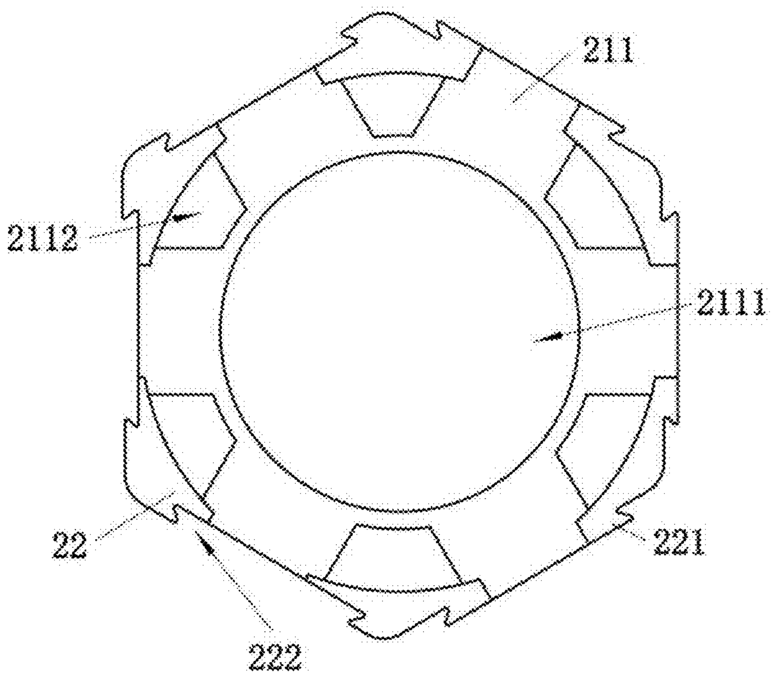
FIG. 4 is a top view of a base provided by the present application.

Optionally, as shown in FIG. 4, the plurality of gluing slots 2112 are extended to the plurality of side plates 22 one by one, so that redundant glues adhered on the battery cell 1 may be squeezed to the plurality of side plates 22 after an end of the battery cell 1 is placed into the installation slot 24, thereby increasing the bonding area between the battery cell 1 and the base 2, so as to improve the bonding effect.

Optionally, a width of each of the gluing slots 2112 is gradually increased towards outside of the installation slot 24 along a radial direction of the via hole 2111. The above arrangement makes less glues close to the via hole 2111 and more glues close to the side plates 22, so as to prevent from blocking the via hole after the glues are overflowed. Compared with a case that the width of each of the plurality of gluing slots 2112 remains unchanged, the above arrangement may increase amount of the glues applied to improve the bonding and the fixation effects.

By designing the base 2 as prismatic, a number of the bases 2 with which each of the bases 2 can be spliced may be further increased, thus making a structure of the plurality of battery cells 1 after they are grouped more compact.

The base 2 is designed as a rectangular plate or a regular hexagon plate to facilitate splicing of the plurality of bases 2. Rectangular plates and regular hexagon plates may be respectively spliced into a relatively complete rectangular region, and a shape of a spliced region is a standard shape, which is convenient for planning an installation location of the battery cell module in the battery system, and is beneficial to improve space utilization.

In the embodiment, the base body 21 is designed as a regular hexagonal prism structure, so that the base 2 is in a regular hexagonal prism shape as a whole, so as to further save splicing space.

Figure 5:
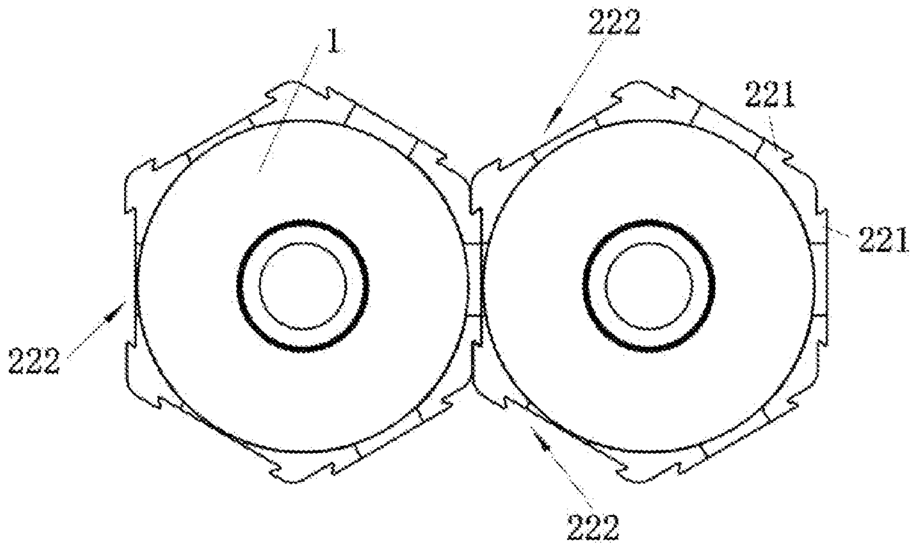
FIG. 5 is a top view of two battery cells spliced through the base provided by the present application.

To realize splicing between adjacent bases 2, each of the side plates 22 is provided with a clamping block 221 or a clamping slot 222, as shown in FIG. 3 and FIG. 5. When two adjacent bases 2 are spliced, a first one of two opposite side plates 22 in the two adjacent bases 2 is provided with the clamping block 221, and a second one of the two opposite side plates 22 is provided with the clamping slot 222. The two adjacent bases 2 may be spliced and fixed through engagement of the clamping block 221 with the clamping slot 222. Shapes and sizes of the clamping block 221 and the clamping slot 222 are the same, respectively, so that the clamping block 221 is configured to accommodate in the clamping slot 222 after they are spliced, which may make outer contours of the two opposite side plates 22 disposed respectively on the two adjacent bases 2 overlap, so as to reduce a splicing gap and make the splicing more compact.

Optionally, the clamping slot 222 penetrates through two ends of the base 2 along an axial direction of the base 2, so that the clamping slot 222 is defined as a through-slot. The above arrangement enables the clamping block 221 to move in a positive direction and a negative direction along the axial direction of the base 2, so as to be engaged with or disengaged from the clamping slot 222, which is more convenient for an installation.

In addition, errors of a size of the clamping block 221 and a size of the clamping slot 222 can be compatible by disposing the clamping slot 222 as the through-slot. For example, when the size of the clamping block 221 is greater than the size of the clamping slot 222 along the axial direction of the base 2, a matching location of the clamping block 221 and the clamping slot 222 along the axial direction may be adjusted to make top surfaces of adjacent battery cells 1 flush, so as to ensure relative location accuracy of the plurality of battery cells 1 after they are grouped.

In the embodiment, as shown in FIGS. 4 and 5, a width of the clamping slot 222 is gradually increased towards inside of the accommodating slot 24 along the radial direction of the battery cell 1, and a shape of the clamping block 221 is matched with a shape of the clamping slot 222, so that an inner wall of the clamping slot 222 can prevent the clamping block 221 from pulling out of the clamping slot 222 along the radial direction of the battery cell 1 after the clamping block 221 is engaged with the clamping slot 222, which is beneficial to improve an engagement effect between the clamping block 221 and the clamping slot 222.

For example, the clamping slot 222 is defined as a trapezoidal slot, and a sectional shape of the clamping block 221 along the radial direction of the battery cell 1 is trapezoidal.

For two opposite side surfaces of the base body 21, the side plate 22 connected to a first side surface is provided with the clamping block 221, and the side plate 22 connected to a second side surface is provided with the clamping slot 222, so that structures of the plurality of spliced bases 2 are the same. That is, only one type of the bases 2 needs to be manufactured in the battery cell module, which is beneficial to reduce processing cost and facilitate splicing.

In the embodiment, the base body 21 is designed as a regular hexagonal prism structure. Each of the side plates 22 connected to three adjacent edges of the base body 21 is correspondingly provided with the clamping block 221, and each of the side plates 22 connected to another three adjacent edges of the base body 21 is correspondingly provided with the clamping slot 222.

As shown in FIG. 1 and FIG. 5, since the battery cell 1 is cylindrical, a side surface of each of the side plates 22 facing each of the battery cells 1 corresponding to the side plate is an arc-shaped surfaces matched with an outer wall of the battery cell 1 so as to improve fixing and position effects of the accommodating slot 24 on the battery cell 1. A side surface of each of the side plates 22 away from the battery cell 1 corresponding to the side plate is a plane to facilitate a processing of the clamping block 221 and the clamping slot 222 on the side plate 22, so as to reduce processing difficulty, which is beneficial to improve a processing accuracy of the clamping block 221 and the clamping slot 222. The side surface of each of the side plates 22 away from the battery cell 1 is a plane, which is further beneficial to improve a clamping accuracy of two opposite side plates, making a structure of two adjacent bases after they are connected more compact.

Since the side surface of each of the side plates 22 away from the battery cell 1 corresponding to the side plate 22 is the plane, and the side surface of the side plate 22 facing the battery cell 1 is the arc-shaped surface, a thickness of the side plate 22 is uneven. A thickness at a connection location of two side plates 22 is greater, and a thickness at a middle location of the side plate 22 is less. In order to reduce a size and processing cost of the battery cell module after the bases 2 are spliced, a distance between the side plate 22 and an axis of the base 2 is designed to be as small as possible, resulting in a thin thickness in a middle portion of the side plate 22, which makes it difficult to process the middle portion of the side plate 22, and has a poor strength, and is prone to deformation or fracture.

To solve the above problems, as shown in FIG. 3, the middle portion of each of the side plates 22 in the embodiment is provided with a notch 223 with an opening downward facing another end of the battery cell 1. By disposing the notch 223, thinner portion of each of the side plates 22 may be removed, and thicker and stronger portion of each of the side plates 22 may be retained, thereby reducing processing difficulty of the base 2, improving strength of the base 2, saving materials, and reducing cost.

In the embodiment, the notches 223 is extended to a top surface of the top plate 211, so that each of the side plates 22 includes two extension arms disposed at intervals, and the extension arms of the two adjacent side plates 22 are connected and located at a corner of the base body 21.

In the embodiment, the base 2 is designed as an integrated molding structure to facilitate processing and reduce costs.

The battery system provided in the embodiment adopts the above cell module, with high processing accuracy, low cost, and a reliable structure.

What is claimed is:

1. A battery cell module, comprising a plurality of battery cell units, wherein each of the battery cell units comprises a battery cell and a base, and bases of adjacent ones of the battery cell units are detachably connected to each other; each of the bases comprises an installation slot and a pressure relief cavity communicated with each other, wherein an end of the battery cell is disposed in the installation slot, and the pressure relief cavity is provided with a plurality of pressure relief holes, wherein each of the bases comprises a base body and a plurality of side plates, wherein the base body is provided with the pressure relief cavity, and a top surface of the base body is provided with a via hole communicated with the pressure relief cavity; wherein the plurality of side plates are connected to the base body and disposed surrounding a circumferential edge of the base body; wherein the installation slot is defined by the top surface of the base body and the plurality of side plates, and the installation slot is communicated with the via hole; and wherein the plurality of pressure relief holes are respectively disposed on side walls of the base body; and wherein the base body comprises:

a top plate, configured to support an end of the battery cell located in the installation slot;

a bottom plate disposed opposite to and spaced apart from the top plate to form the pressure relief cavity between the top plate and the bottom plate, wherein the via hole is configured to penetrate through the top plate and the bottom plate; and a plurality of reinforcing blocks disposed between the top plate and the bottom plate and arranged at intervals along a circumferential direction of the via hole, wherein a respective one of the pressure relief holes is formed between any two adjacent ones of the reinforcing blocks.

2. The battery cell module of claim 1, wherein two opposite side plates of any two adjacent ones of the battery cell units are engaged with each other.

3. The battery cell module of claim 2, wherein the base body is a regular prism structure, each side surface of the base body is provided with a respective one of the side plates, a number of the side plates disposed on the base body is an even number, a first one of the two opposite ones of the side plates is provided with a clamping block, and a second one of the two opposite ones of the side plates is provided with a clamping slot.

4. The battery cell module of claim 3, wherein a width of the clamping slot is configured to gradually increase radially along the battery cell toward an interior of the installation slot, and a shape of the clamping block is matched with a shape of the clamping slot.

5. The battery cell module of claim 3, wherein the base body is a regular hexagonal prism structure.

6. The battery cell module of claim 3, wherein the battery cell is cylindrical, side surfaces of the plurality of side plates facing the battery cell are arc-shaped surfaces matched with an outer wall of the battery cell, and side surfaces of the plurality of side plates away from the battery cell are flat surfaces.

7. The battery cell module of claim 6, wherein a middle portion of each of the plurality of side plates is provided with a notch with an opening facing upward and toward another end of the battery cell.

8. The battery cell module of claim 1, wherein the base is an integrally formed structure.

9. The battery cell module of claim 1, wherein a height of the pressure relief cavity ranges from 5 mm to 20 mm.

10. The battery cell module of claim 1, wherein a depth of the installation slot ranges from 5 mm to 20 mm.

11. A battery cell module, comprising a plurality of battery cell units, wherein each of the battery cell units comprises a battery cell and a base, and bases of adjacent ones of the battery cell units are detachably connected to each other; each of the bases comprises an installation slot and a pressure relief cavity communicated with each other, wherein an end of the battery cell is disposed in the installation slot, and the pressure relief cavity is provided with a plurality of pressure relief holes, wherein the battery cell is fixedly bonded to the installation slot; each of the bases comprises a base body and a plurality of side plates, wherein the base body is provided with the pressure relief cavity, and a top surface of the base body is provided with a via hole communicated with the pressure relief cavity; the plurality of side plates connected to the base body and disposed surrounding a circumferential edge of the base body, wherein the installation slot is defined by the top surface of the base body and the plurality of side plates, and the installation slot is communicated with the via hole; the base body comprises:

a top plate, configured to support an end of the battery cell located in the installation slot;

a bottom plate disposed opposite to and spaced apart from the top plate to form the pressure relief cavity between the top plate and the bottom plate, wherein the via hole is configured to penetrate through the top plate and the bottom plate; and a plurality of reinforcing blocks disposed between the top plate and the bottom plate and arranged at intervals along a circumferential direction of the via hole, wherein a respective one of the pressure relief holes is formed between any two adjacent ones of the reinforcing blocks.

12. The battery cell module of claim 11, wherein the installation slot is provided with a plurality of gluing slots.

13. The battery cell module of claim 12, wherein the plurality of gluing slots are disposed on a bottom surface of the installation slot and close to an inner wall of the installation slot.

14. The battery cell module of claim 13, wherein the plurality of gluing slots are extended into the plurality of reinforcing blocks, respectively.

15. The battery cell module of claim 14, wherein a width of each of the gluing slots is configured to gradually increase radially along the battery cell toward an outside of the installation slot.

16. A battery system, comprising a battery cell module, wherein the battery cell module comprises a plurality of battery cell units, wherein each of the battery cell units comprises a battery cell and a base, and bases of adjacent ones of the battery cell units are detachably connected to each other; each of the bases comprises an installation slot and a pressure relief cavity communicated with each other, wherein an end of the battery cell is disposed in the installation slot, and the pressure relief cavity is provided with a plurality of pressure relief holes, wherein each of the bases comprises a base body and a plurality of side plates, wherein the base body is provided with the pressure relief cavity, and a top surface of the base body is provided with a via hole communicated with the pressure relief cavity; wherein the plurality of side plates are connected to the base body and disposed surrounding a circumferential edge of the base body; wherein the installation slot is defined by the top surface of the base body and the plurality of side plates, and the installation slot is communicated with the via hole; and wherein the plurality of pressure relief holes are respectively disposed on side walls of the base body; and wherein the base body comprises:

a top plate, configured to support an end of the battery cell located in the installation slot;

a bottom plate disposed opposite to and spaced apart from the top plate to form the pressure relief cavity between the top plate and the bottom plate, wherein the via hole is configured to penetrate through the top plate and the bottom plate; and a plurality of reinforcing blocks disposed between the top plate and the bottom plate and arranged at intervals along a circumferential direction of the via hole, wherein a respective one of the pressure relief holes is formed between any two adjacent ones of the reinforcing blocks.

17. The battery system of claim 16, wherein the base is an integrally formed structure.

* * * * *